United States Patent [19]
Baker

[11] 3,711,603
[45] Jan. 16, 1973

[54] METHOD OF CONTROLLING BACTERIA WITH TRICHLOROACRYLONITRILE

[75] Inventor: Don R. Baker, Orinda, Calif.
[73] Assignee: Stauffer Chemical Co., New York, N.Y.
[22] Filed: May 26, 1971
[21] Appl. No.: 147,195

[52] U.S. Cl............................424/304, 71/67
[51] Int. Cl. .....................................A01n 9/20
[58] Field of Search.............................424/304

[56] References Cited
UNITED STATES PATENTS 3,145,138    8/1964    Baker et al. ..................424/304

Primary Examiner—Jerome D. Goldberg
Assistant Examiner—Allen J. Robinson
Attorney—Daniel C. Block, Edwin H. Baker, Albert J. Adamcik and Harry A. Pacini

[57] ABSTRACT

This invention relates to a method of controlling bacteria by applying an effective amount of trichloroacrylonitrile to the habitat thereof.

1 Claim, No Drawings

METHOD OF CONTROLLING BACTERIA WITH TRICHLOROACRYLONITRILE

DESCRIPTION OF THE INVENTION

This invention relates to the novel use of trichloroacrylonitrile. More particularly, the present invention involves the novel use of trichloroacrylonitrile as a bactericide and algaecide.

As a composition of matter, trichloroacrylonitrile is known and described in prior art and its method of preparation is likewise adequately described. Moreover, its use as a fungicide and nematocide is described in U.S. Pat. No. 3,145,138. However, there is no disclosure of the novel use of the subject compound as described herein.

The following tests clearly demonstrate the activity of trichloroacrylonitrile.

Test 1

Algaecide and Bactericide Test

This test measures the bactericidal and algicidal properties of a compound when in contact with a growing bacterium or algae in an artificial medium. The test is conducted by adding 20 ml. portions of a suitable warm steril agar solution into 20 × 100 mm. petri dishes. Next, the test compound (0.5 percent in acetone) is added to the petri dishes at levels of 1, 5, 10 and 50 µg/ml and mixed with the warm mobile agar solution. The treated agar mixture is then allowed to cool to room temperature and solidify. Cells of the particular organism are then streaked on the surface of the solidified agar and then incubated for such lengths of time that the untreated samples containing no toxicant show luxurious growth typical of the particular organism. This time varies from 24 hours to 1 week, depending upon the particular organism. The bacteria are incubated at 30° to 37°C. and the algae at room temperature under artificial light. Nutrient agar is used as the medium for the bacteria and a modified Jack Meyers solution plus agar is used as the medium for the algae. The table below shows the results when trichloroacrylonitrile are run in this test.

| Bacteria | Concentration Necessary for Control (µg/ml) | |
|---|---|---|
| Pseudomonas aeruginosa | (10) | a. |
| Bacillus cereus | 50 | b. |
| Algae | | |
| Scenedesmus obliquus | (50) | |
| Chlorella pyrinoidosa | 50 | |

( ) indicates partial control at this concentration.
a. incubated at 37°C.
b. incubated at 30°C.

Test 2

Sulfate Reducing Bactericidal Test

This test measures the bactericidal effectiveness of a compound against sulfate reducing bacteria when grown in an artificial medium. The test is conducted using steril vials containing 9.0 ml. sulfate API broth with tryptone under anaerobic conditions. To these vials are added the test compound (0.5 percent in acetone) at levels to give 1, 5, 10 and 50 µg/ml final concentration. Next, to the vials are added 0.4 ml. steril distilled water and 0.5 ml. of the growing sulfate reducing bacterium innoculant. The vials are incubated at room temperature for 1 week and are then examined for growth of the organism. When *Desulfovibrio desulfuricans* is used as the organism in this test, trichloroacrylonitrile gave control at a level of 50 µg/ml.

What is claimed is:

1. A method of controlling bacteria in a bacteria habitat which comprises applying to said bacteria a bactericidally effective amount of trichloroacrylonitrile.

* * * * *